United States Patent [19]
Morgan et al.

[11] Patent Number: 5,137,852
[45] Date of Patent: Aug. 11, 1992

[54] HIGH TEMPERATURE CERAMIC COMPOSITES

[75] Inventors: Peter E. D. Morgan; David B. Marshall, both of Thousand Oaks, Calif.

[73] Assignee: Rockwell International Corp., Seal Beach, Calif.

[21] Appl. No.: 639,857

[22] Filed: Jan. 11, 1991

[51] Int. Cl.$^5$ .............................. C04B 35/76
[52] U.S. Cl. .................... 501/95; 428/366; 428/370; 428/378
[58] Field of Search .............. 501/95; 428/325, 330, 428/331, 366, 370, 372, 378, 379, 381, 384, 388

[56] References Cited

U.S. PATENT DOCUMENTS

| | | | |
|---|---|---|---|
| 4,869,943 | 9/1989 | Corbin et al. | 428/114 |
| 4,885,199 | 12/1989 | Corbin et al. | 428/113 |
| 4,916,092 | 4/1990 | Tiegs et al. | 501/89 |

*Primary Examiner*—William R. Dixon, Jr.
*Assistant Examiner*—Chris Gallo
*Attorney, Agent, or Firm*—John C. McFarren

[57] ABSTRACT

Thermodynamically stable ceramic composites are provided for use in high temperature oxidizing environments. The composites comprise high strength alumina fibers ($Al_2O_3$) in a ceramic matrix. The ceramic matrix comprises material similar to the fibers to improve compatibility of the composite materials. A material selected from the $\beta$-alumina and magnetoplumbite family of materials is used to provide a weakly bonded interface between the fibers and the ceramic matrix. $\beta$-aluminas and magnetoplumbites have weak layers as an intrinsic characteristic of their crystal structure, which comprise spinel layers (basically $Al_2O_3$) separated by very weakly bonded planes containing the $\beta$-forming ions. The weak planes of these materials allow preferential debonding and sliding, and thus inhibit crack growth across the interface between the fibers and the ceramic matrix. The alumina fibers can be coated with $\beta$-alumina by any of several methods such as heat treating the fibers in an atmosphere containing the desired $\beta$-forming ions. Composite structures can be fabricated by placing the coated fibers in powdered matrix material and hot pressing. $\beta$-alumina can also be formed in situ within a preformed composite by providing the $\beta$-forming ions in a compound that is phase compatible with the ceramic matrix material and then heat treating the composite to form $\beta$-alumina at the fiber-matrix interface.

13 Claims, 1 Drawing Sheet

HIGH TEMPERATURE CERAMIC COMPOSITES

TECHNICAL FIELD

The present invention relates to ceramic composites and, in particular, to high temperature ceramic composites in which a member of the $\beta$-alumina/magnetoplumbite family of structurally related materials provides a weakly bonded interface between alumina fibers and a ceramic matrix.

BACKGROUND OF THE INVENTION

It has been established that weak interfaces are desirable in ceramic composites between the reinforcing fibers and the ceramic matrix material to attain toughening from the fiber reinforcements over a wide range of temperatures. An unbonded or weakly bonded interface allows sliding between the fibers and the matrix, and/or preferential crack deflection around the fibers, for optimal toughening of the composite. Although composites containing layers of carbon or BN at the fiber/matrix interface have been developed, there are no weakly bonded composites known in the prior art that are stable in very high temperature, oxidizing environments. Previous work has shown that it is difficult to find suitable composite systems comprising a ceramic matrix, fibers having high strength and high Young's modulus, and a weakly bonded interface material, all of which exhibit long term compatibility in high temperature oxidizing environments. Furthermore, most suitable fibers and matrices are multiphase materials. This generally reduces the compatibility of the materials, particularly over a range of temperatures, and increases the complexity of chemical processing. The use of barrier layers to separate incompatible materials is undesirable because it adds to the complexity of the system and only postpones unwanted chemical reactions. Thus, there is a need for new high temperature ceramic composites that have a weakly bonded interface between reinforcing fibers and matrix materials and that are thermodynamically stable in oxidizing environments at temperatures up to approximately 1800°-1900° C.

SUMMARY OF THE INVENTION

The present invention comprises a family of high temperature ceramic composite materials that are thermodynamically stable in oxidizing environments at temperatures up to approximately 1800°-1900° C. (i.e., up to about the melting point of the materials). The composites comprise high strength alumina fibers ($Al_2O_3$) in a ceramic matrix. The $Al_2O_3$ fibers have a high Young's modulus and may be in single crystal or polycrystalline form. In the preferred embodiments, the ceramic matrix comprises material similar to the fibers to improve compatibility of the composite materials. A material selected from the $\beta$-alumina/magnetoplumbite family of structurally related materials is used to provide the desired weakly bonded interface between the fibers and the ceramic matrix. $\beta$-aluminas and magnetoplumbites have been identified for this use because they include weakly bonded layers as an intrinsic characteristic of their crystal structure. Crystals of these materials comprise spinel layers (basically $Al_2O_3$) separated by very weakly bonded planes containing the $\beta$-forming ions. In a ceramic composite, the weak planes of the $\beta$-alumina debond (or crack) preferentially, thus allowing "frictional" sliding between the fibers and the ceramic matrix and inhibiting crack growth across the interface.

In one method of fabricating the ceramic composites of the present invention, alumina fibers can be coated with a $\beta$-alumina material by heat treating the fibers in an atmosphere containing the desired $\beta$-forming ions. $\beta$-alumina can also be formed by conventional powder ceramic or chemical methods and then applied by dipping the fibers in a slurry or precursor mixture, for example, to form a coating on the fibers. Composite structures can be fabricated by placing the coated fibers in $Al_2O_3$ powder, for example, and hot pressing the fiber/powder mixture. $\beta$-alumina can also be formed in situ within a preformed composite by providing the $\beta$-forming ions in a compound that is phase compatible with the ceramic matrix material and then heat treating the composite to form $\beta$-alumina at the fiber/matrix interface.

BRIEF DESCRIPTION OF THE DRAWINGS

For a more complete understanding of the present invention and for further advantages thereof, the following Detailed Description of the Preferred Embodiments makes reference to the accompanying Drawings, in which.

DETAILED DESCRIPTION OF THE PREFERRED EMBODIMENTS

The present invention comprises a family of high temperature ceramic composites that include $\beta$-aluminas or magnetoplumbites. A member of the $\beta$-alumina/magnetoplumbite family of structurally related materials is used to provide a weakly bonded interface between reinforcing alumina fibers and a ceramic matrix material. The weak planes of the $\beta$-alumina structure debond preferentially and allow sliding between the fibers and matrix to inhibit crack growth across the interface.

Figure 1:
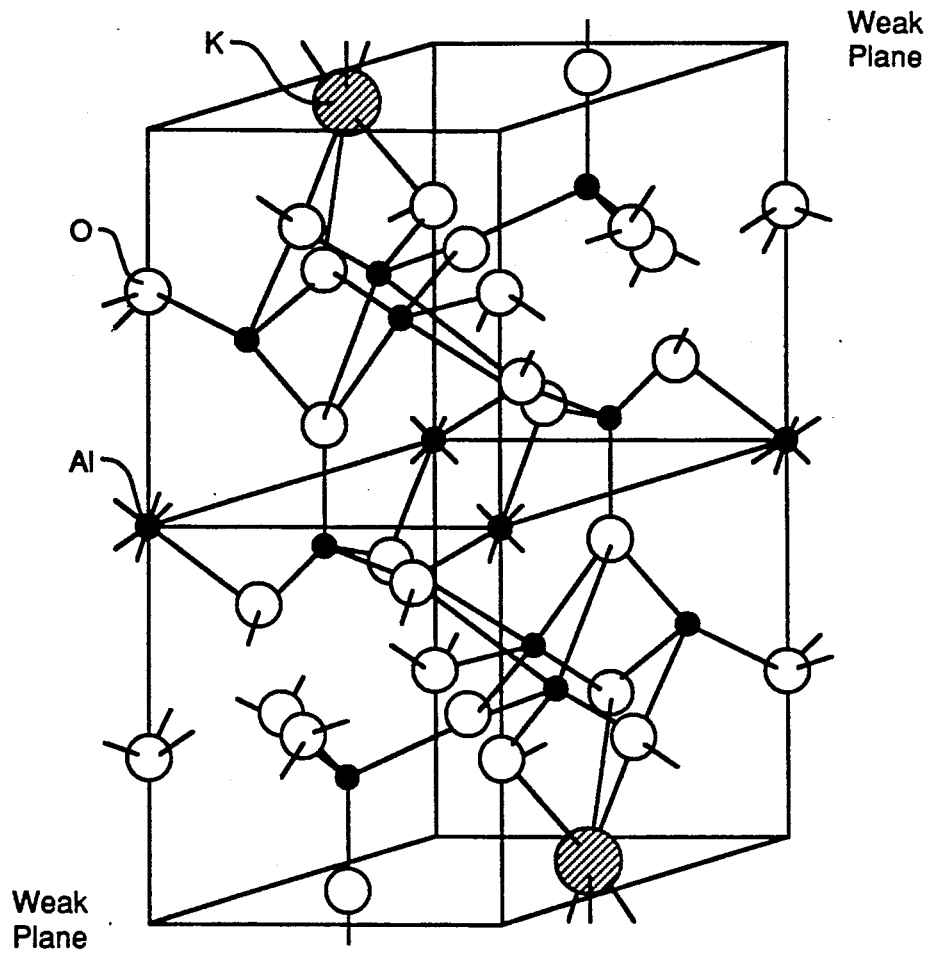
FIG. 1 is a schematic depiction of the crystal structure of K-$\beta$-alumina.

The $\beta$-alumina family of materials (including magnetoplumbites) comprise layers of spinel blocks, $[Al_{11}O_{17}]-$, with $\beta$-forming cations in the interstices between the layers. These materials have a weak cleavage basal plane between spinel-like layers of a hexagonal (or rhombohedral) structure. The $\beta$-alumina family of materials includes several related structures (commonly referred to as $\beta$, $\beta''$, $\beta'''$, $\beta^{iv}$) that differ in the number of oxygen layers in each spinel block (e.g., 4 or 6), the arrangement of the cations between the blocks, and the stacking order of the blocks. The crystal structure of potassium $\beta$-alumina, a representative of this family, is illustrated in FIG. 1. The spinel block illustrated in FIG. 1 comprises aluminum (Al), oxygen (O), and potassium (K) ions as indicated, with weak planes at the top and bottom of the block. The existence of weak layers in the structure is somewhat analogous to that more familiar in mica. However, the number of elements in $\beta$-alumina is much smaller than in mica, which greatly simplifies synthesis, phase relations, and compatibility of materials. Furthermore, the spinel layers in $\beta$-alumina are thicker than the alumino-silicate sheets in mica, thus reducing the fraction of modifying cations required. $\beta$-alumina structures are also stable in oxidizing atmospheres at temperatures up to about 1800°–1900° C. (i.e., near the melting point of the materials).

$\beta$-aluminas are members of an extended family of layered structures comprising spinel layers $[X_{11}O_{17}]^-$, where $X=Al^{3+}$, $Fe^{3+}$, $Ga^{3+}$, $Cr^{3+}$, etc., interleaved with a variety of weaker layers such as:

(M')$^+$, where M' is Na$^+$, K$^+$, etc.;
(M''XO$_2$)$^+$, where M'' is Ca$^{2+}$, Sr$^{2+}$, Ba$^{2+}$, etc.;
(M'''O)$^+$, where M''' is La$^{3+}$, Nd$^{3+}$, etc.

The foregoing weak layers separate the spinel layers and form the following structurally related materials:

M'$[X_{11}O_{17}]$, $\beta$-aluminas;
M''XO$_2[X_{11}O_{17}]$, magnetoplumbites;
M'$_{\frac{1}{2}}$M'''$_{\frac{1}{2}}$XO$_2[X_{11}O_{17}]$, magnetoplumbite types; and
M'''O$[X_{11}O_{17}]$, related rare earth types.

In addition, other mixed substitutions between spinel blocks and interspinel layers, such as M'''XO$_2[Z^{2+}X_{10}O_{17}]$ for example, where $Z^{2+}$ is Mg$^{2+}$, Co$^{2+}$, Ni$^{2+}$, etc., are also possible.

The ability of the weak planes of the foregoing $\beta$-aluminas and related materials to inhibit crack growth across an interface has been demonstrated by indentation tests performed on large crystals of $\beta''$-Na$_2$Li$_{0.5}$Al$_{10.5}$O$_{17}$. The edge of a plate-shaped crystal (c-axis normal to the plate) was polished and loaded by a Vickers diamond indenter with its diagonals oriented to generate cracks parallel to and normal to the weak planes. Extensive splitting occurred parallel to the weak layers, whereas only a few small cracks formed normal to the layers, all of which ended at cracks parallel to the weak planes. Indentation of the face of the plate (i.e., normal to the weak planes) caused flaking of the surface similar to the well-known effect exhibited by mica. Based on the sizes of the indentations and the induced cracks in the crystals of $\beta''$-Na$_2$Li$_{0.5}$Al$_{10.5}$O$_{17}$, the fracture toughness for crack growth parallel to the weak planes has been estimated to be an order of magnitude less than the toughness for crack growth normal to the planes. This difference, which is a factor of 100 in terms of the fracture energy, is within the conditions of fracture mechanics necessary for a crack to deflect along a weak interface of a composite.

Sodium $\beta$-aluminas have long been investigated for use in Na/S batteries because the mechanically weak alkali-containing layers support fast ionic transport of the monovalent ions. However, the weak layers limit the strength of $\beta$-alumina ceramics, especially at large grain size, making their use in batteries impractical at the present time. Furthermore, Na-$\beta$-aluminas do not appear to be the most desirable materials for the present invention because of the fairly high solubility of Na$^+$ in Al$_2$O$_3$. Typical commercial aluminas contain approximately 0.02% Na, yet crystalline NaAl$_{11}$O$_{17}$ is not reported as being present in these fired powders or ceramics. This is not surprising because the ionic radius of Na$^+$ is 1.16 Å, and Mg$^{2+}$ at 0.86 Å, for example, is appreciably soluble in Al$_2$O$_3$.

Potassium $\beta$-aluminas are of interest for use in the present invention because the solubility of K$^+$ in Al$_2$O$_3$ is immeasurably small as a result of its much larger ionic radius of 1.52 Å. Precipitation of K-$\beta$-aluminas in Al$_2$O$_3$ has been observed at very low levels of potassium. The stability and detectability of these phases is increased by the presence of low levels of Mg$^{2+}$, which stimulates the formation of $\beta'''$ and $\beta^{iv}$ types that have thicker spinel layers but the same weak interspinel bonds. The use of K-$\beta$-aluminas in ceramic composites is believed to be an important discovery because these materials form easily, persist at high temperatures, have mechanically weak layers, and are compatible with alumina. Therefore, K-$\beta$-alumina is presently believed to be a preferred material for providing a weakly bonded interface between alumina fibers and ceramic matrices comprising, for example, Al$_2$O$_3$, $\beta$-aluminas, magnetoplumbites, or MgAl$_2$O$_4$.

Alumina fibers and plates have been coated with K-$\beta$-alumina by exposing the fibers to partial pressure of K$_2$O vapor at 1400° C. for periods as short as 15 minutes. In theory, only nanometer thickness layers of $\beta$-alumina are needed for the interface, which should not degrade the strength of the fibers. For an alumina plate having its c-axis perpendicular to the plate surface, the K-$\beta$-alumina forms with its c-axis parallel to the c-axis of the plate, so that the weak bond layers, which are perpendicular to the c-axis of the K-$\beta$-alumina, are parallel to the surface of the plate. Other crystallographic orientations of alumina fibers and plates are being investigated with respect to the orientation of K-$\beta$-alumina platelets formed on the alumina fibers and plates. $\beta$-aluminas can also be formed by conventional powder ceramic or chemical methods and then applied to the fibers. $\beta$-alumina coatings can be applied to the fibers using well known methods such as sol-gel or alkoxide precursors, slurries of small $\beta$-alumina particles, and physical vapor deposition.

Figure 2:
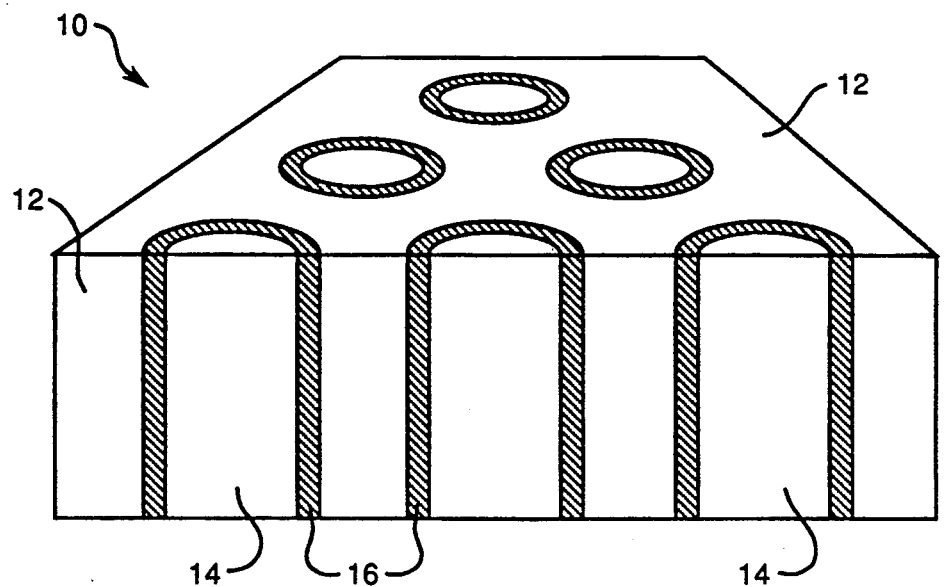
FIG. 2 is a schematic illustration of a ceramic composite of the present invention.

An example of a ceramic composite of the present invention is illustrated schematically in FIG. 2. Composite 10 includes a ceramic matrix 12 with embedded alumina fibers 14. Fibers 14 include a $\beta$-alumina coating 16 that provides the weakly bonded interface between fibers 14 and matrix 12. Composite 10 may be formed by heat treating sapphire or polycrystalline fibers 14, for example, in an atmosphere of K$_2$O vapor as described above to coat fibers 14 with K-$\beta$-alumina. Fibers 14 having coating 16 may be placed in Al$_2$O$_3$ powder, for example, and then the powder-fiber mixture can be hot pressed to form ceramic composite 10.

It is believed that K-$\beta$-alumina coatings can also be formed on fibers in situ within a preformed composite having specific matrices. A representative reaction is the following:

Matrix      Fiber
MgAl$_2$O$_4$ + KAlO$_2$ + Al$_2$O$_3$ $\longrightarrow$

Matrix      Fiber Coating      Fiber
     MgAl$_2$O$_4$ + $\beta'''$-KMg$_2$Al$_{15}$O$_{25}$ + Al$_2$O$_3$ This type of reaction requires that the matrix materials, such as MgAl$_2$O$_4$ and KAlO$_2$ in the above example, be phase compatible. It is anticipated that this method of forming a weak interface in a ceramic composite system will be highly desirable for its simplicity and the possibility of enhanced grain growth control.

The foregoing description suggests the following composite systems, which are listed by way of example and not limitation, as having potential in providing useful weak interfaces between alumina fibers and the matrix material:

| Fiber | Interface | Matrix |
|---|---|---|
| Al$_2$O$_3$ | KAl$_{11}$O$_{17}$ | Al$_2$O$_3$ or $\beta$-alumina |
| Al$_2$O$_3$ | $\beta'''$-KMg$_2$Al$_{15}$O$_{25}$ | MgAl$_2$O$_4$ |
| Al$_2$O$_3$ | CaAl$_{12}$O$_{19}$ | Ca stabilized ZrO$_2$ |

-continued

| Fiber | Interface | Matrix |
| --- | --- | --- |
| $Al_2O_3$ | $GdMgAl_{12}O_{19}$ | $GdAlO_3$ or $Gd_3Al_5O_{12}$ |

Although the present invention has been described with respect to specific embodiments thereof, various changes, modifications, and substitutions may be suggested to one skilled in the art. Therefore, it is intended that the present invention encompass such changes and modifications as fall within the scope of the appended claims.

We claim:

1. A ceramic composite, comprising:
   a ceramic matrix;
   ceramic fibers embedded in said ceramic matrix; and
   a material selected from the group of structurally related materials consisting of $\beta$-aluminas and magnetoplumbites, said material forming a weakly bonded interface between said matrix and said fibers.

2. The ceramic composite of claim 1, wherein:
   said ceramic matrix comprises material selected from the group consisting of $Al_2O_3$, $\beta$-aluminas, magnetoplumbites, $MgAl_2O_4$, $Ca/ZrO_2$, $GdAlO_3$, and $Gd_3Al_5O_{12}$;
   said ceramic fibers comprise alumina; and
   said weakly bonded interface material is a $\beta$-alumina material having cations selected from the group consisting of potassium, calcium, magnesium, and gadolinium.

3. The ceramic composite of claim 2, wherein:
   said ceramic matrix consists essentially of alumina; and
   said weakly bonded interface material consists essentially of K-$\beta$-alumina.

4. The ceramic composite of claim 2, wherein:
   said ceramic matrix consists essentially of $MgAl_2O_4$; and
   said weakly bonded interface material consists essentially of $\beta'''$-$KMg_2Al_{15}O_{25}$.

5. A high temperature ceramic composite, comprising:
   a ceramic matrix;
   alumina fibers embedded in said ceramic matrix; and
   a material selected from the group of materials consisting of $\beta$-aluminas and magnetoplumbites having layers of spinel blocks with weak cleavage planes between said layers, said material forming a weakly bonded interface between said matrix and said alumina fibers.

6. The high temperature ceramic composite of claim 5, wherein:
   said ceramic matrix comprises a material selected from the group consisting of $Al_2O_3$, $\beta$-aluminas, magnetoplumbites, $MgAl_2O_4$, $Ca/ZrO_2$, $GdAlO_3$, and $Gd_3Al_5O_{12}$; and
   said weakly bonded interface material is a $\beta$-alumina material having cations selected from the group consisting of potassium, calcium, magnesium, and gadolinium.

7. The high temperature ceramic composite of claim 6, wherein:
   said ceramic matrix consists essentially of alumina; and
   said weakly bonded interface material consists essentially of K-$\beta$-alumina.

8. The high temperature ceramic composite of claim 6, wherein:
   said ceramic matrix consists essentially of $MgAl_2O_4$; and
   said weakly bonded interface material consists essentially of $\beta'''$-$KMg_2Al_{15}O_{25}$.

9. A method of forming a high temperature ceramic composite, comprising the steps of:
   providing a matrix of ceramic material;
   providing alumina fibers for reinforcing said ceramic matrix;
   coating said alumina fibers with an interface material selected from the group of materials consisting of $\beta$-aluminas and magnetoplumbites having layers of spinel blocks with weak cleavage planes between said layers; and
   embedding said coated alumina fibers in said ceramic matrix so that said interface material forms a weakly bonded interface between said alumina fibers and said ceramic matrix material.

10. The method of claim 9, wherein the step of coating said alumina fibers comprises coating said alumina fibers with a material selected from the group consisting of potassium $\beta$-aluminas.

11. The method of claim 10, wherein the step of coating said alumina fibers with a potassium $\beta$-alumina comprises heat treating said alumina fibers in an atmosphere containing $K_2O$ at a temperature of approximately 1400° C.

12. The method of claim 11, wherein the step of providing said matrix comprises providing a matrix of alumina.

13. The method of claim 9, wherein the step of coating said alumina fibers further comprises the steps of:
   providing $\beta$-forming ions in a compound that is phase compatible with said ceramic matrix
   mixing said fibers and said $\beta$-forming compound in said matrix; and
   heat treating said mixture to form said coating on said fibers in situ.

* * * * *